June 21, 1949.  G. M. BOOTH  2,473,986
WATER PURIFICATION UNIT
Filed Oct. 18, 1945  5 Sheets-Sheet 1
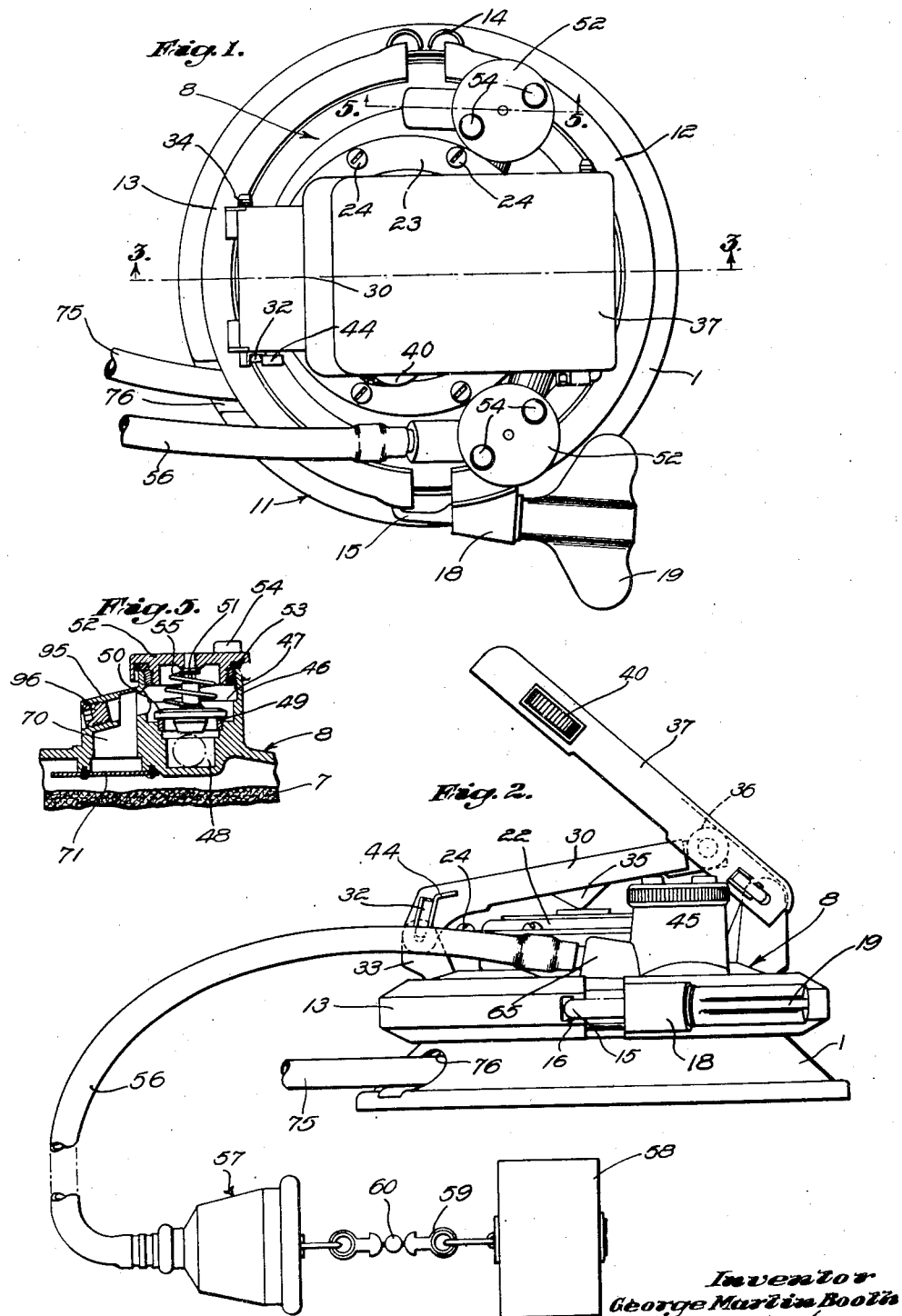
Inventor
George Martin Booth June 21, 1949.  G. M. BOOTH  2,473,986
WATER PURIFICATION UNIT
Filed Oct. 18, 1945  5 Sheets-Sheet 2

June 21, 1949.  G. M. BOOTH  2,473,986
WATER PURIFICATION UNIT
Filed Oct. 18, 1945  5 Sheets-Sheet 3

Inventor
George Martin Booth
By Ernest D. Rivca
Attorney

June 21, 1949.　　　　G. M. BOOTH　　　　2,473,986
WATER PURIFICATION UNIT
Filed Oct. 18, 1945　　　　　　　　　　　　5 Sheets-Sheet 4
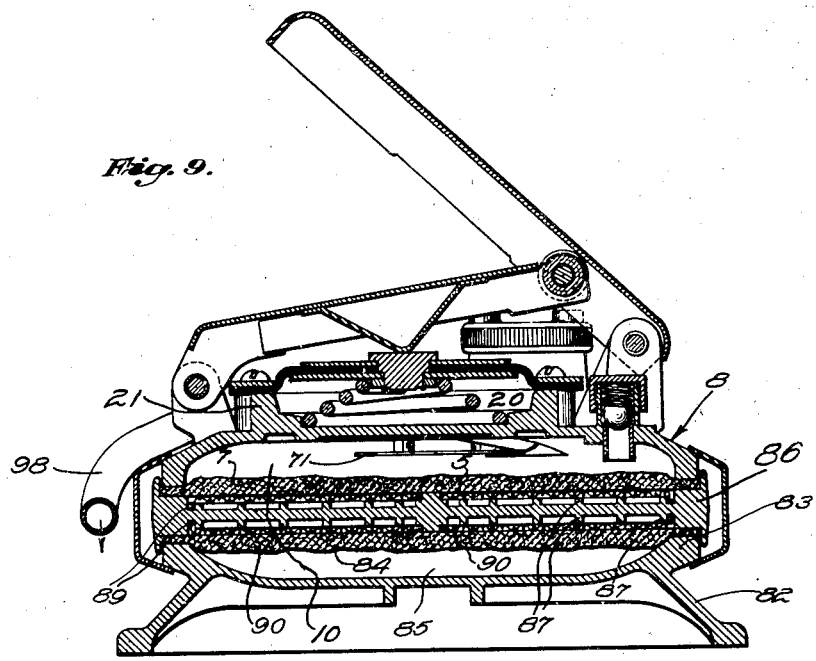
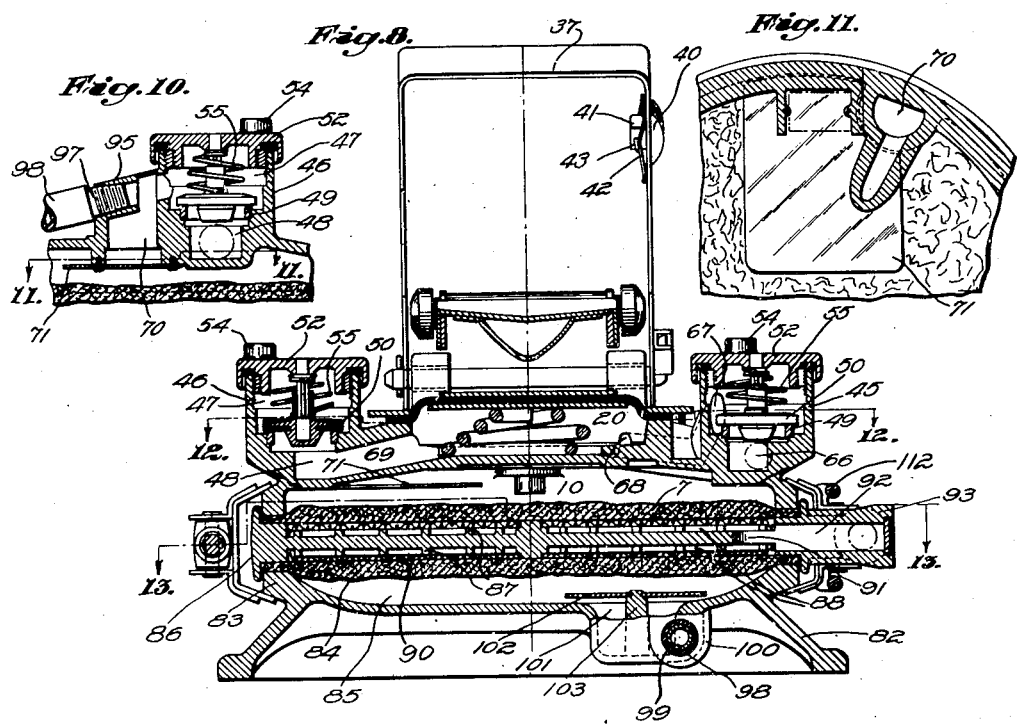
Inventor
George Martin Booth June 21, 1949.   G. M. BOOTH   2,473,986
WATER PURIFICATION UNIT
Filed Oct. 18, 1945   5 Sheets-Sheet 5
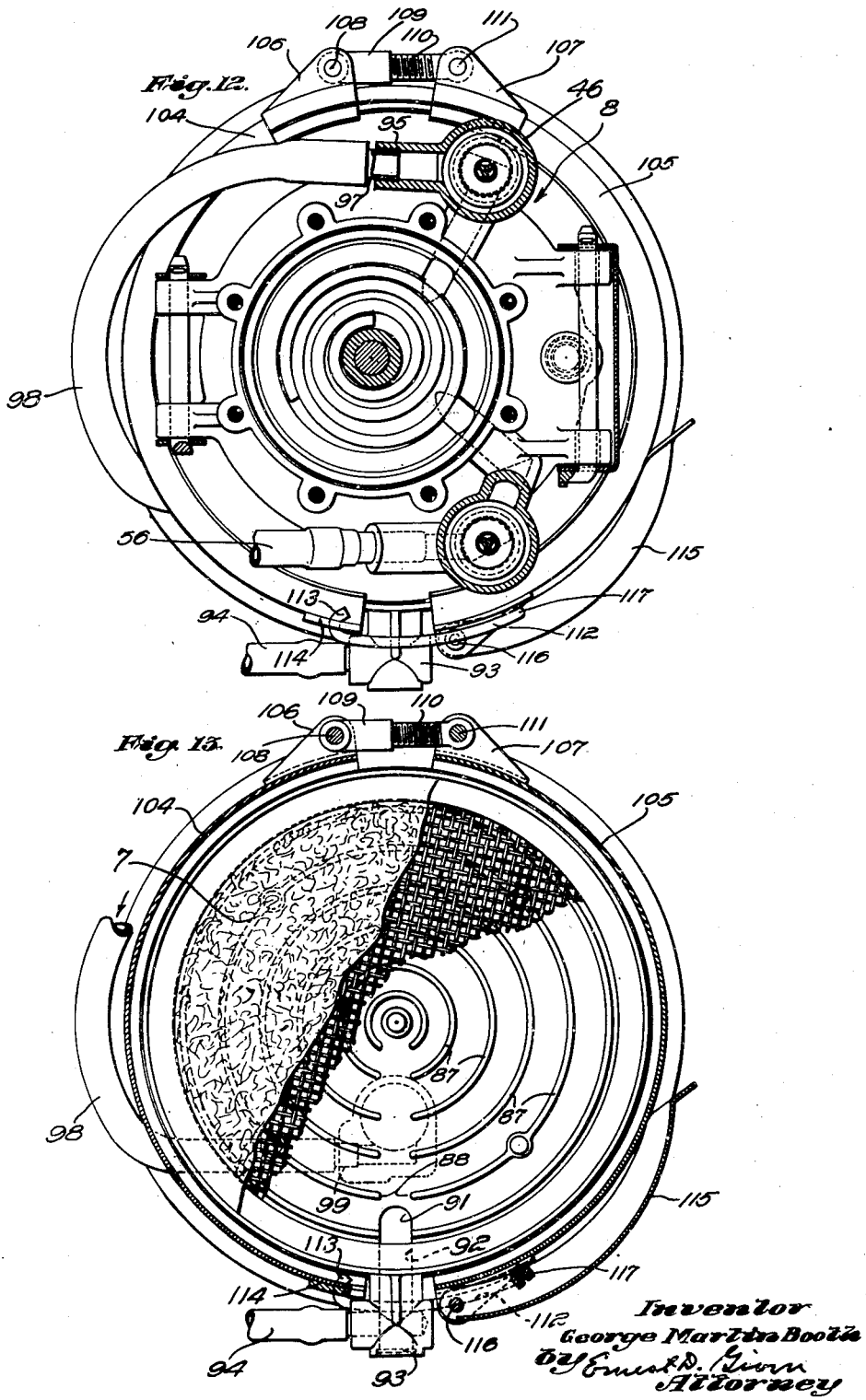

Patented June 21, 1949

2,473,986

UNITED STATES PATENT OFFICE 2,473,986

WATER PURIFICATION UNIT

George Martin Booth, Westfield, N. J., assignor to Wallace & Tiernan Co. Inc., Belleville, N. J., a corporation of New York Application October 18, 1945, Serial No. 623,096

5 Claims. (Cl. 210—185)

My present invention relates to a water purification unit and more particularly to a combination pump and filter unit, which may be particularly useful for small groups of persons who are operating at a distance from sources of supply of safe potable water.

When such a group is operating in a remote area, it is often possible to locate water supplies, but these water supplies are usually not dependable either by reason of containing dirt or other solid material therein, or by reason of the presence therein of bacterial growths which render them unsuitable for human consumption without suitable preliminary treatment. The present invention seeks to provide an apparatus by which such an available supply of water may be used by drawing up from its original source and filtering therefrom materials which may be mechanically separated from the water by a filtration treatment. Thereafter the water may be purified by suitable chemical treatment, for example chlorination, to kill undesired bacterial organisms. By the use of this equipment, for example, a group of persons of a size from that of an Army squad to that of a platoon, are enabled to operate in some of the tropical areas where they have been required to work and fight in World War II far from sources of approved water and without danger of illness by reason of drinking impure water.

With an apparatus as hereinafter particularly set forth, soldiers or other persons may fill their canteens from any available sources of water, the present invention having for its primary purpose the provision of means for drawing water from an available source and delivering it in such a way that the consuming personnel may fill their canteens or other water carrying equipment, and the water thus delivered being substantially free from all matter which may be filtered out by a mechanical filtration operation. The provision of such an apparatus is a primary object of the present invention.

Among the further objects of the present invention are to provide a small compact apparatus, the parts of which are easily accessible for cleaning, replacement or repair, one which can be operated by the using personnel without requiring external power sources other than manual energy; and yet apparatus which is light, not easily damaged and sufficiently small so that it may be easily carried by the using personnel without undue effort and without taking up so much space as to be cumbersome. The present apparatus is so designed that it is useful not only for military personnel in the field, but also for civilian personnel as on camping or hunting trips where the sources of water may be of a dubious nature, and it is desired to provide purified water for drinking and cooking purposes.

Among the further and more detailed objects of the present invention are to provide apparatus of the character described using replaceable filter pads, an adequate supply of which may be carried by the using personnel, which is easily and quickly adapted for the replacement of such filter pads, and wherein any parts which become clogged or otherwise rendered inoperative may be reached with a minimum of effort and with available equipment, thus eliminating the necessity of a special tool kit for the maintenance thereof.

Other and more detailed objects of the present invention will become apparent from the following description and appended claims when taken in connection with the accompanying drawings, in which:

Figure 1 is a plan view of one embodiment of the present invention, the induction and effluent tubes being cut off for convenience of illustration;

Fig. 2 is a view in elevation of the device of Fig. 1, the induction tube being shown foreshortened, and showing the induction nozzle and float therefor;

Fig. 5 is a fragmentary view in vertical section taken substantially on the line 5—5 of Fig. 1;

Fig. 8 is a view substantially in vertical section taken on the broken line 8—8 of Fig. 6.

Fig. 9 is a view in vertical transverse section taken substantially on the line 9—9 of Fig. 6;

Fig. 10 is a fragmentary view of the outlet valve of Fig. 6 taken substantially on the line 10—10 thereof;

Fig. 11 is a fragmentary view substantially in horizontal section taken on the line 11—11 of Fig. 10;

Fig. 12 is a view partly in elevation and partly in horizontal section substantially on the line 12—12 of Fig. 8; and Fig. 13 is a view substantially in horizontal section substantially on the line 13—13 of Fig. 8 and with certain parts broken away to show the interior construction.

Figure 3:
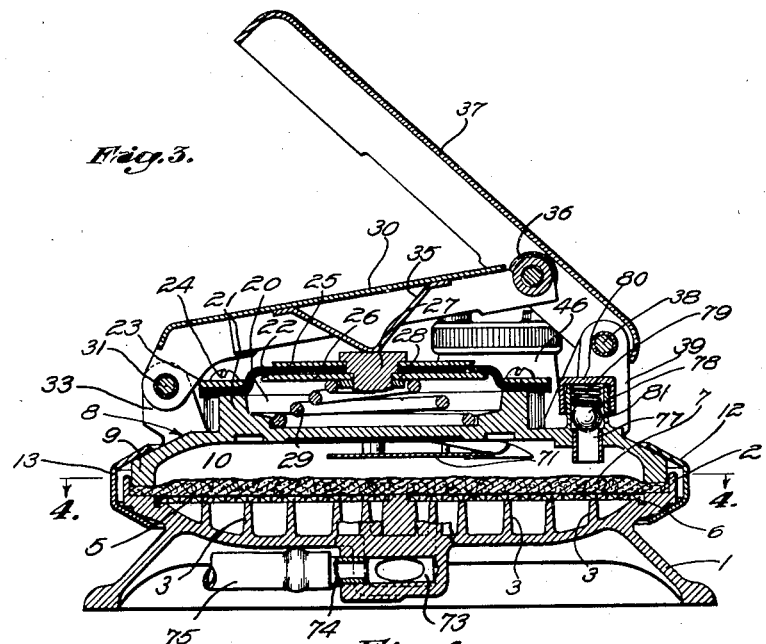
Fig. 3 is a view in central vertical section taken substantially on the line 3—3 of Fig. 1.

Turning now to the accompanying drawings, there is shown in Figs. 1 to 5, inclusive, one form of the invention using a single filter pad, and in the remaining figures a more complicated form using two filter pads with an intermediate separable filter leaf. In both cases the pump mechanism used in forced the liquid through the filter pad or pads is substantially the same; and both types of apparatus achieve the same general results with differing capacities as to the amount of purified water which they will deliver. For this reason the parts of both forms will be referred to by the same reference characters in so far as they are essentially the same. The form of Figs. 1 to 5 will first be described.

The apparatus shown in these figures comprises basically a diaphragm type pump equipped with intake and outlet valves, a compound lever actuating means for the pump by which the amount of force which can reasonably be manually brough to bear onto the pump is made effective to actuate it with a desired force, and a filter unit including a removable filter pad arranged in and as a part of the same unit on the outlet side of the pump, so that the liquid, usually water, is forced through the filter and thence through an eduction or effluent passage to a selected delivery point, but one filter pad being provided in this form of the invention.

Referring now to the accompanying drawings, the apparatus comprises a base 1, which may be made of any suitable material, such as metal, and may in practice be die cast, this base being provided with an upwardly directed annular flange 2 for locating a filter pad hereinafter to be described. The base 1 is provided with an upwardly directed, discontinuous, filter-supporting surface formed by a plurality of semi-annular ribs 3, having aligned openings therein as indicated at 4 to provide for outflow of effluent. The ribs 3 have their upper surfaces or edges in substantially a single horizontal plane and serve to support a wire screen 5, which is preferably of substantially the same shape as the base, in this case circular, and which is located within an undercut portion at the periphery of the base as shown at 6. Supported on the wire screen 5 is a filter pad 7, which may be of any suitable construction, and is preferably of a desired porous material such as a paper pulp, bound together as are the fibers in filter paper. It may be desired in some instances to use in conjunction with this filter pad a pulverulent filter aid, such as kieselguhr.

Associated with the base and filter means previously described is a head generally indicated at 8, which has a downwardly directed annular flange 9 adapted to engage the peripheral portion of the filter pad 7 as best shown in Fig. 3. This flange 9 defines a central space 10 to which liquid to be filtered is supplied by the pump means hereinafter described.

Figure 4:
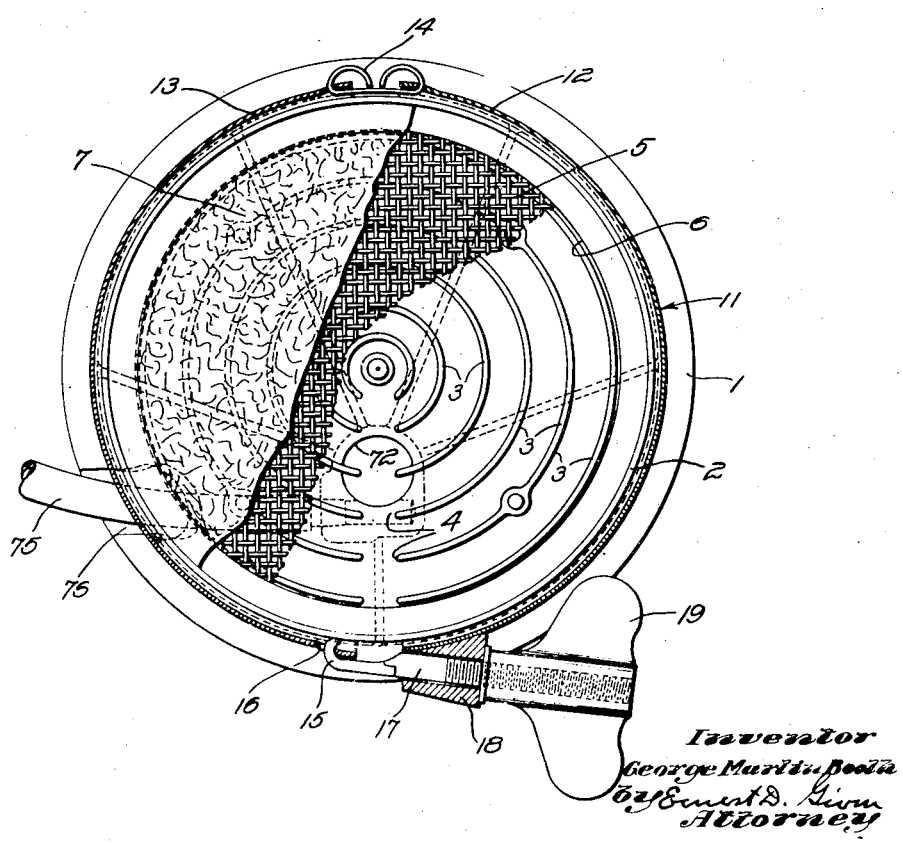
Fig. 4 is a view in horizontal section substantially on the line 4—4 of Fig. 3 and with parts broken away.

For holding the parts in assembled relation, there is provided a multi-part clamping ring generally designated at 11, which comprises substantially semi-circular portions 12 and 13 connected as indicated best in Fig. 4 by a wire hinge forming means 14, and arranged to be clamped by suitable means, comprising as shown a hooked member 15 adapted to be engaged in the aperture 16 in the part 13. The member 15 is arranged on the end of a threaded bolt 17, which passes loosely through a hole in a lug 18 secured to the part 12, and has its threaded outer end engaged by a thumb screw 19. The parts 12 and 13 are both provided with inwardly directed flange portions as shown best in Fig. 3 which engage over substantially complementarily shaped parts of the base 1 and head 8, respectively. Thus when the parts 12 and 13 of the clamping ring 11 are placed in position as generally shown in Fig. 4, the hooked member 15 may be engaged in the aperture 16 and the thumb screw 19 tightened to hold the head 8 and base 1 and other parts previously described above in assembled relation as shown best in Figs. 3 and 4.

The head 8, except as hereinafter noted, is substantially the same in both forms of the invention. This head carries a diaphragm pump and its associated valves, and also the actuating means for the pump and the necessary passage means for the flow of liquid to and from the pump to the filter chamber. The head 8 may be formed of any suitable material such as metal, preferably of some non-ferrous type, and may be made in any desired manner, as for example, by die casting.

Centrally of the head 8 is formed an upwardly facing chamber or depression indicated at 20, which serves as a pump chamber, this chamber being formed laterally by an upstanding flange 21, preferably integral with the head 8. The top of the pump chamber is defined by a flexible diaphragm 22, which may be of rubber or some rubber-like material, and which is retained in position by an annular retaining ring 23 secured to the head 8 in any suitable manner as by a plurality of screws 24. The diaphragm 22 is shown as an annulus and is provided with central reinforced means including upper and lower plates 25 and 26, and a central actuating button 27 secured to the upper and lower plates 25 and 26 by means such as a nut or collar 28, the button 27 having several diameters as shown for positioning the several parts (see Fig. 3). An annular or cone-shaped compression spring 29 extends between the bottom of the pump chamber 20 and the under side of the central reinforcing means 25—28 for the diaphragm, and serves to oppose the downward force exerted on the diaphragm, as hereinafter set forth.

Means are provided for actuating the diaphragm pump in response to manual force applied substantially centrally of the unit and in a generally downward direction, this means preferably comprising a compound lever arrangement which will now be described.

A lever 30, which may be made up from sheet metal, is provided pivoted to the head 8 on a substantially horizontal axis at one side of the center thereof as shown at 31. The hinge pin 31 has one end bent at an angle as shown at 32, Figs. 1 and 2, and disposed between upstanding lugs on the adjacent part of the lever 30, and extending through aligned holes in a pair of upstanding ears 33, rigidly secured to or integral with the head 8, the other end of the hinge pin 31 extending out as shown in Fig. 1 and being secured against accidental displacement as shown at the upper portion thereof by suitable means such as a cotter pin 34. The lever 30 is provided with a rigid abutment portion 35 shown in Fig. 3, which is generally conical in shape and is suitably rigidly secured to the underside of the lever so that the apex portion thereof will engage the upper surface of the button 27, substantially centrally thereof. At its end remote from its fulcrum or pin 31, the lever 30 carries suitable anti-friction devices or rollers 36 for engaging the underside of lever 37 as shown in Figs. 2 and 3. The lever 37 is pivoted to the head 8 on a substantially horizontal axis here shown as pintle pin 38, similar to the pin 31, this axis being substantially parallel to the axis about which the lever 30 swings, and disposed on the diametrically opposite side of the head 8. The pintle 38 connects the lever 37 to a pair of upstanding ears 39, which may be rigid or integral with the head 8 as described for the ears 33. The lever 37 may also be made of suitably shaped sheet metal and is arranged to engage the anti-friction means 36 of the lever 30, so that upon counter-clockwise movement of the lever 37 as seen in Fig. 3, the lever 30 is caused to move clockwise about its axis to depress the diaphragm against the action of the compression spring 29.

The lever 37 is adapted to be manually actuated either by hand or foot power by force exerted in a generally downward direction and centrally of the unit, so that the force thus applied will not have any substantial tendency to turn the unit over. The compound lever arrangement just described in practice may be constructed to afford substantially a 15 to 1 multiplication of the force applied to the lever 37, so as to provide adequate power for actuating the pump and for securing the desired pressure effective on the liquid to be filtered.

When the unit is packed for carrying it from place to place, it is desired that means be provided for locking the levers 30 and 37 in their positions closely adjacent to the head 8. For this purpose, a slide member 40 is provided in one of the down-turned flange portions of the lever 37, this construction being best illustrated in Fig. 8. The slide 40 has a lug portion 41 passing through a slot (not shown) in the lever 37, and a sheet spring-like retainer 42 through which the lug portion 41 passes engaging the inside of the down-turned flange of the lever 37, the retainer 42 being kept in its assembled position by means of a cotter pin 43. In order to lock the levers 30 and 37 in their travelling position, the lever 30 has an extension 44, Fig. 2, rigid therewith, below which the lug 41 engages when the lever 37 is moved downwardly and the slide member 40 moved to the left as seen in Fig. 2.

Also carried by the head 8 are the intake and outlet valves for the pump, these valves being preferably similar each to the other, so that the actuating parts thereof are interchangeable. This feature in use makes it possible for but one set of spare valve parts to be carried, so that these parts may be used interchangeably for either valve. As shown, each valve is provided within an extension extending preferably integral with the head 8, that for the intake valve being shown at 45, Fig. 2, and that for the outlet valve being shown at 46, Figs. 3 and 5. In Fig. 5 is shown the detailed construction of the outlet valve, it being understood that the moving means for and general construction of the inlet valve is substantially identical therewith.

Referring to Fig. 5, the extension 46 is provided with a large diameter effluent chamber 47 and a smaller diameter influent chamber 48 below and substantially concentric therewith, a valve seat 49 being shown as an insert at the juncture of these two chambers. A movable valve member 50 is provided for cooperation with the seat 49 and has an upwardly directed hollow stem portion which maintains it in a central position by receiving therein a centering pin 51, carried by a head 52. The head 52 has threaded engagement with internal threads in the extension 46 and a gasket 53 engaging the upper edge of the extension 46 to prevent leakage at this point. The head 52 has a pair of bosses 54 extending upwardly therefrom for engagement by any suitable available tool such as a bar or the back of a knife by which the head 52 may be tightened or loosened as may be necessary. A compression spring 55 extends between the head 52 and the upper side of the valve member 50 as shown in Fig. 5.

Means are provided in connection with the present invention for the drawing of a liquid, in this case water, from a source of supply thereof at a point where a minimum of impurities will be drawn into the apparatus, so as to relieve the filter portion thereof from unnecessary work and to prolong its effective life before requiring the removal and replacement of the filter pad 7. For this purpose it is desired that the water be drawn from a level in the source of supply below the surface thereof, so as to avoid drawing into the apparatus floating impurities, and well above the bottom of a pond or stream, so as to avoid drawing any silt or other impurities from the bottom.

Figure 7:
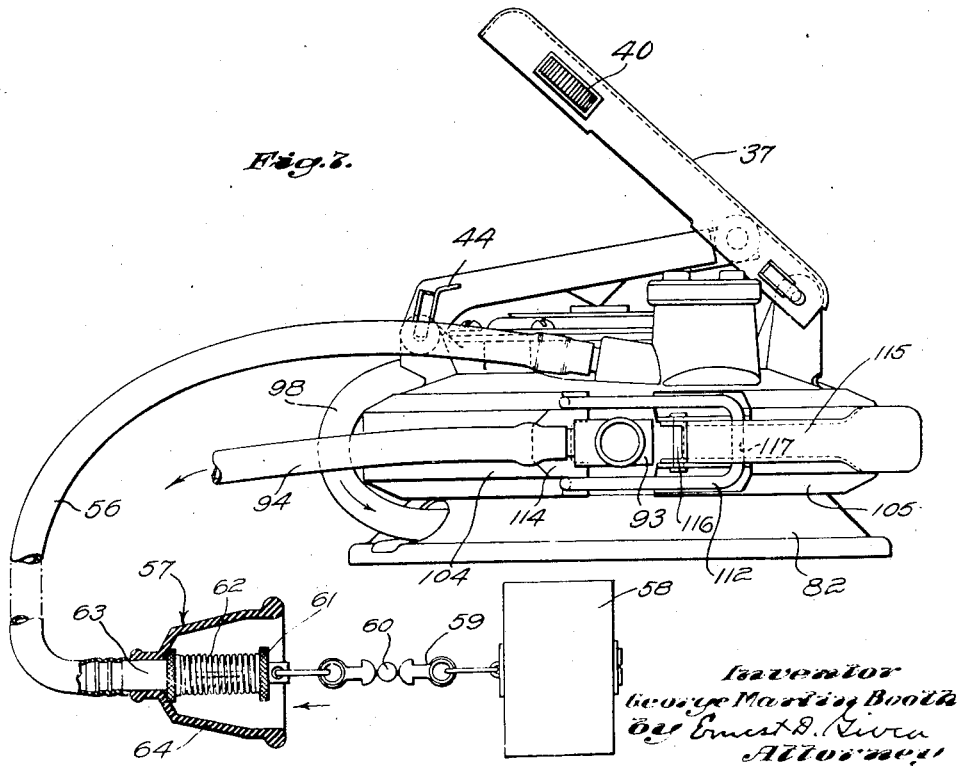
Fig. 7 is an elevation of the form of invention shown in Fig. 6, the induction nozzle being shown in transverse section.

For this purpose a flexible hose 56 is provided having a nozzle means generally indicated at 57 at the end thereof (Figs. 2 and 7). The nozzle means 57 is sufficiently heavier than water so as to normally sink therein and thus to prevent surface impurities being drawn into this nozzle. However, in order to provide for the holding of this nozzle at substantially a predetermined distance below the surface, a suitable float 58 may be employed, which is connected to the nozzle by a chain means 59 having a swivel connection 60 therein. This chain means is connected to a member 61, Fig. 7, which in turn is connected through a helical spring 62 to a fitting 63 of metal or other rigid material which carries the nozzle member 64, the latter being preferably of some flexible material such as rubber.

Water entering the tube 56 must pass between the turns of the spring 62, which is sufficiently resilient and strong so as to have the turns spaced about a predetermined distance apart in normal operation. However, should any foreign substances or pieces thereof become lodged between the turns of this spring, they may easily be dislodged by stretching the spring manually and rinsing out the foreign substances, which may be done from time to time as necessary.

The tube 56 connects on to suitable fitting extending from a boss 65, Fig. 2, which is connected through to the lower or influent chamber of the intake valve within the extension 45, this chamber corresponding to that shown in Fig. 5 at 48. This construction is substantially identical with that shown on the right in Fig. 8, wherein this lower chamber is shown at 66. The liquid passes thence upwardly through the valve against compression of the spring 55 therein, and then through suitable bores or other passages as shown at 67 and 68 to the pump chamber 20 (Figs. 3 and 8). The water passes thence through a passage forming means 69 from the pump chamber 20 to the influent chamber 48 of the outlet valve as shown in Figs. 5, 8 and 10, and thence upwardly through the outlet valve as shown in Figs. 5 and 10. From the outlet valve, the water passes laterally and downwardly through a passage forming means generally indicated at 70, Fig. 5, to the upper portion of the space 10 above the filter pad 7, being distributed in this space by a shield or baffle indicated at 71, which is suitably secured as by screws to adjacent parts of the head 8, as shown in Figs. 5, 10 and 11.

After passing through the filter pad 7 into the channels between the ribs 3 in the base 1, the liquid may pass through the spaces 4 between the ends of the ribs to an outlet passage 72, Fig. 4, and thence to a well 73, Fig. 3, this well having a suitable nipple 74 associated with it, to which is attached a delivery or effluent tube or hose 75. The tube 75 passes through a suitable aperture 76 formed in the side of the base 1, as shown in Figs. 1, 2 and 4, and may be of any desired length, so as to deliver the purified water to a desired delivery point such as a canteen or other container.

As a desired safety feature, means are provided for preventing the building up of excessive fluid pressure within the space 10 for liquid to be filtered. For this purpose a safety valve arrangement is provided including a tube 77, Fig. 3, set rigidly in a suitable aperture through head 8, and having its upper portion serving as a valve seat for a ball valve 78, which is urged toward a seat by a suitable compression spring 79 held in place by a screw cap 80 adjustably threaded onto an upward extension from the head 8. A suitable aperture 81 is provided above the seat in the side wall of the upward extension from the head 8. Thus if the fluid pressure builds up more than an amount predetermined by the compression of the spring 79, as determined by the adjustment of the position of the cap 80, the valve 78 will be forced off its seat to relieve such pressure.

The operation of the device above described should now be obvious. The action of the diaphragm pump with its associated inlet and outlet valves provides the necessary suction to draw the water to be filtered through the hose 56 and force it under pressure into the space 10, whence it passes through the filter pad 7 and is thereby freed from undesired impurities of a solid nature; and thence passes to the delivery tube 75. The apparatus may be quickly disassembled for purposes of cleaning, replacement or repair of the parts, and particularly for the replacement of the filter pad 7. This disassembly and reassembly requires no special tools and may be done by personnel operating in the field far from any available tool kit or machine shop.

Referring now to the form of the invention shown in Figs. 6 to 13, inclusive, there is provided a device essentially similar to that previously described with the exception, however, that instead of having a single filter pad as shown at 7, there are provided duplex filtering means including two filter pads. The several differences between this form and the form of the invention shown in Figs. 1 to 5, inclusive, will now be described, it being understood that the parts of this embodiment of the invention not particularly described hereinafter in respect thereto will be understood to be the same as or substantially equivalent to those previously described.

As shown in Figs. 6 to 13, the apparatus is built with a base 82 similar to the base 1 in certain respects, but having at its upper portion an upstanding peripheral flange 83 adapted for contact with the peripheral portion of a downwardly facing filter pad 84 and providing within such peripheral flange and beneath the filter pad 84 a space 85. The filter pads 7 and 84 are preferably interchangeable. In this form of the invention, both filter supporting surfaces are provided on the opposite sides of a central filter leaf generally indicated at 86, each of these surfaces being provided by a plurality of substantially annular ribs 87 which are broken at at least one point to provide a channel 88 as best shown in Fig. 13, and to provide interconnected channels between the ribs, these channels connecting through the channel 88. The filter leaf 86 is further provided with a substantially circular recessed portion 89 on both its upper and lower surfaces for receiving woven wire screens as shown at 5 and 90, which in turn support filter pads 7 and 84, which are respectively upwardly and downwardly facing. The channels 88 above and below the filter leaf connect through an aperture 91, Fig. 8, and with an effluent passage 92, which leads to the interior of a boss 93 formed rigid or integrally with the filter leaf 86 and arranged for connection to effluent tube or hose 94, Figs. 8, 12 and 13. The head 8 of these figures is substantially the same as that previously described, so that this head and the parts carried thereby are identified by the same reference numbers. The only substantial difference between the head construction in this form of the invention and that previously described is in the provision for liquid passage from the outlet valve within the extension 46 of the head, as particularly shown in Fig. 10 to the space 85 in the base below the lower filter pad 84. For this purpose, a boss 95 formed on the side of the extension 46, and which is shown in Fig. 5, as plugged by a suitable screw plug 96, is here provided with a nipple 97, to which a flexible tube or hose 98 is connected, this tube passing through a suitable aperture in the base 82 to a nipple 99 extending from a hollow boss 100 formed rigid or integral with the under side of the base 82. Water is thus conducted from the outlet valve shown in Fig. 10, to the space 85 through the passage means just described, this water passing into a well portion 101 at the bottom of the base 82, as best shown in Fig. 8, and being distributed around the space 85 by a suitable baffle 102 shown as a circular disc secured to a stud 103 rigid with the base 82.

In this form of the invention, a somewhat different type of clamping ring for holding the base 82, the head 8, the filter leaf 86 and associated parts in assembled relation is provided. This change is required by the necessity that the clamping ring be so designed as to accommodate the boss 93 and outlet tube 94. Means are also provided for making an adjustment in the effective circumference of the clamping ring. In this form, the clamping ring is shown made up of semi-circular parts 104 and 105, which have suitable extensions as best shown in Figs. 12 and 13 at 106 and 107, respectively. The extension 106 is pivoted on a vertical axis at 108 to a swing socket member 109, in which is threaded a swing bolt 110 pivoted on a similar vertical axis at 111 to the extension 107.

Figure 6:
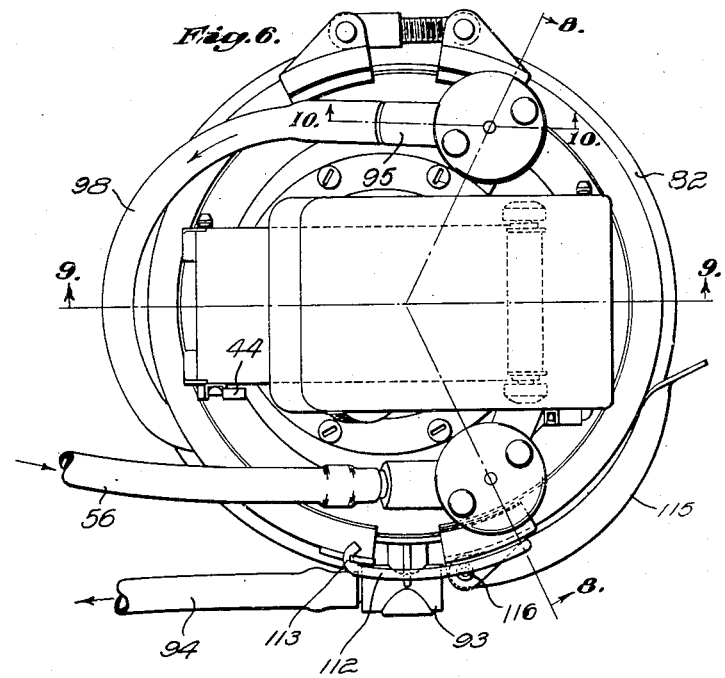
Fig. 6 is a plan view of another form of the invention, the view being substantially similar to that of Fig. 1.

For clamping the parts 104 and 105 together, there is provided a pair of hooks formed on the end of a U-shaped wire member 112, the hooks being shown best in Fig. 6 at 113, and engaging suitable portions of a member 114 secured rigidly to the part 104, Figs. 6 and 7. To hold the member 112 in locking position, there is provided an over-center throw lever arrangement including a lever 115, Figs. 7, 12 and 13, which is pivoted to the part 105 on a substantially vertical axis at 116 and to the member 112 on a vertical axis at the bight of the U at 117. The legs of the U-shaped member 112 straddle the boss 93 and thus permit the removal and replacement of the clamping ring formed by parts 104 and 105, the member 104 passing inside the loop of the pipe or tube 98, as shown in Fig. 6, so as to position the open ends of the parts 104 and 105 on opposite sides of the boss 93. The hooks 113 may then be engaged with the suitable portions of the member 114, and the lever 115 swung to the position shown in Figs. 6, 12 and 13 to lock the parts in assembled relation. In the event that the parts are not sufficiently tight, the hooks 113 may be disengaged, the part 105 swung outwardly and then rotated sufficiently in respect to the member 104 to thread the bolt 110 into the socket 109 to a desired and necessary extent, whereupon the coupling is completed.

It will be understood that the operation of the device of Figs. 6 to 13 will be substantially the same as that previously described in so far as the pump action thereof is concerned, but that water passing from the outlet valve from the pump, which is shown in Fig. 10, passes thence both to the space 10 above the filter pad 7 and to the space 85 below the lower filter pad 84 through the pipe 98. The liquid thence flows through both filter pads, which are thus caused to act in parallel, to a single passage shown at 92, and thence through the tube 94 to a desired point of use.

While there is shown and described herein but two forms of the present invention, it is contemplated that various changes may be made therein, and particularly in specific details thereof, without departing from the spirit of the present invention as defined by the appended claims.

What is claimed is:

1. A water purification unit, comprising a base, a filter support carried thereby substantially concentric therewith and providing a discontinuous supporting surface and a plurality of interconnected channels and adapted to support a removable filter pad, a head having a downwardly turned peripheral flange for engaging the periphery of a filter pad, means engaging the outer peripheral portions of said base and said head to hold all the parts aforesaid in assembled relation, said head including a centrally located diaphragm pump provided with intake and outlet valves, passage means with which said intake valve is associated to conduct water to be filtered from a source thereof to said diaphragm pump, passage means with which said outlet valve is associated for conducting water from said diaphragm pump to the space between said head and said filter pad, passage means for effluent from said unit, passage means connecting said channels to said passage means for the effluent, and compound lever actuating means for said diaphragm pump, said compound lever actuating means comprising two levers, one of which is pivoted on a substantially horizontal axis on one side of the center of the unit and has a portion arranged for contact with a central reinforced portion of said diaphragm, and the other of said levers is arranged for movement about a substantially horizontal axis on the diametrically opposite side of said unit and engageable with a portion of the first named lever remote from its pivotal axis and to be manually operated, both said levers being so constructed and arranged that manual force applied to the second named lever in substantially a vertical downward direction centrally of said pump will be multiplied by said levers and applied to the reinforced portion of said diaphragm substantially concentrically of the entire unit.

2. A water purification unit, comprising a substantially circular base having an upper portion providing a filter support, substantially concentric therewith and providing an upwardly facing filter supporting surface, an upwardly facing circular peripheral surface surrounding said filter supporting surface and adapted to contact and seal with the lower side of a disc of filter material, means providing a chamber beneath said filter supporting surface with effluent means connected thereto, a substantially circular head having a shallow recess on its lower face bounded by a downwardly projecting peripheral flange adapted to contact and seal with the upper face of a disc of filter material, said recess and said flange providing a chamber in said head for influent, a compound lever-actuated diaphragm pump disposed in the upper surface of said head, said pump being arranged for operation by repeated application of a downward force within the circular boundary of the said head, clamping means to maintain said head and said base in operative relation, passage means in said head for conducting water from a source of supply thereof to said diaphragm pump, passage means located in said head for conducting water from said pump to said influent chamber, and valves in said passage means for controlling the respective flows therethrough.

3. A water purification unit, comprising a substantially circular base, a filter support carried thereby substantially concentric therewith and providing an upwardly facing, discontinuous supporting surface including a plurality of substantially annular ribs and forming a plurality of inter-connecting channels between said ribs, means carried at least in part by said ribs for supporting a removable filter pad, a head having a downwardly turned peripheral flange engaging the periphery of a filter pad and providing within said flange a space above the central portion of such filter pad, means engaging outer peripheral portions of said base and said head for holding all the parts aforesaid in assembled relation, said head providing an upwardly facing pump chamber having a centrally disposed diaphragm as its upper closure, means reinforcing the central part of said diaphragm, a compression spring within said pump chamber extending between the lower portion thereof and the centrally reinforced portion of said diaphragm, inlet and outlet valve means for said pump including respectively interchangeable movable parts, passage means to conduct a liquid to be filtered from a source of supply thereof to said inlet valve, passage means from said inlet valve means to said pump chamber, passage means from said pump chamber to said outlet valve means, passage means from said outlet valve means to said space between said head and said filter pad, an effluent passage, and passage means from said channels to said effluent passage; a pair of levers jointly operating to actuate said diaphragm, said levers being pivoted on substantially parallel horizontal axes on opposite sides of the center of said head, one of said levers having a portion arranged to engage said diaphragm and having an anti-friction means at a portion thereof remote from the axis of such lever for engaging the second named lever, and the second named lever operating to actuate the first named lever and to be actuated manually by force applied substantially central of said unit and in a generally downward direction.

4. A water purification unit, comprising a base having an upstanding peripheral flange defining a central influent chamber within said flange, a filter leaf supported by said base and providing upwardly and downwardly directed filter supports, each of which provides a discontinuous supporting surface and a plurality of inter-connected channels, and serves as a support for a removable filter pad, a head having a downwardly turned peripheral flange defining a central influent chamber and for engaging an upwardly facing filter pad supported by said filter leaf, while the first named upwardly extending flange of said base engages the peripheral edge portion of a downwardly facing filter pad supported upon the under surface of said filter leaf, means engaging the outer peripheral portions of said head and said base to hold all the parts aforesaid in assembled relation, said head including a centrally located diphragm pump provided with intake and outlet valves, passage means with which said intake valve is associated to conduct a liquid to be filtered from a source of supply thereof to said diaphragm pump, passage means with which said outlet valve is associated for conducting water from said diaphragm pump to both said influent chambers, an effluent passage, means connecting said channels both above and below said filter leaf with said effluent passage, and compound lever actuating means for said diaphragm pump.

5. A water purification unit, comprising a circular base having an upstanding peripheral flange forming a central influent liquid chamber therein, a filter leaf having similar upper and lower filter supporting surfaces, each of which inclu.es a plurality of substantially annular ribs arranged to provide interconnected channels therebetween, perforate means supported by each of the filter supporting surfaces of said filter leaf for respectively supporting a filter pad, a head having a downwardly extending peripheral flange for engaging the peripheral edge portion of the upwardly facing filter pad on said filter leaf, and providing an influent liquid chamber within said downwardly extending flange, said head having a central, upwardly opening pump chamber covered by a flexible diaphragm, a central reinforcing means for said diaphragm, a compression spring extending between the bottom of said pump chamber and the reinforcing means for said diaphragm, inlet and outlet valve means associated with said head and having respectively interchangeable movable parts, passage means including a flexible hose connection for conducting liquid to be filtered from a source of supply thereof to said inlet valve means, passage means from said inlet valve means to said pump chamber, passage means from said pump chamber to said outlet valve means, passage means from said outlet valve means to said influent chamber in said head defined by said downwardly extending peripheral flange, passage means including a flexible hose connection from said outlet valve means to said influent chamber of said base, an effluent passage including a flexible hose, and passage means in said filter leaf for conducting filtrate from said interconnected channels both above and below said filter leaf to said effluent passage, a pair of actuating levers pivoted to said head on substantially parallel horizontal axes respectively on opposite sides of said head for actuating said diaphragm, one of said levers having a part for engagement with the reinforcing portion of said diaphragm and having means disposed at a point thereon remote from its pivotal axis for actuation by the other of said levers, said levers being so constructed and arranged that force exerted substantially centrally of said unit in a generally downward direction will be multiplied by said levers and applied to actuate said diaphragm in opposition to the compression spring associated therewith.

GEORGE MARTIN BOOTH.

REFERENCES CITED

The following references are of record in the file of this patent:

UNITED STATES PATENTS

| Number | Name | Date |
|---|---|---|
| 280,828 | Howes | July 10, 1883 |
| 629,387 | Nordtmeyer | July 25, 1899 |
| 890,989 | Knight | June 16, 1908 |
| 1,472,896 | Alsop | Nov. 6, 1923 |
| 1,595,344 | Lomax | Aug. 10, 1926 |
| 1,595,345 | Lomax | Aug. 10, 1926 |
| 1,919,040 | Rockwell | July 18, 1933 |
| 1,966,274 | Wells | July 10, 1934 |
| 2,084,346 | Jones | June 22, 1937 |

FOREIGN PATENTS

| Number | Country | Date |
|---|---|---|
| 14,609 | Great Britain | 1894 |
| 20,170 | Great Britain | 1914 |
| 659,691 | France | Feb. 5, 1929 |